3,455,091
SEPARATING VAPOROUS ALDEHYDES FROM
OFFGAS OBTAINED IN THE OXO PROCESS
Horst Herber, Mannheim, Werner Hagen, Heidelberg, and
 Wolfgang Schroeder, Bad Duerkheim, Germany, assignors to Badische Anilin- & Soda-Fabrik Aktiengesellschaft, Ludwigshafen (Rhine), Germany
No Drawing. Filed Nov. 21, 1967, Ser. No. 684,643
Claims priority, application Germany, Nov. 30, 1966,
B 90,068
Int. Cl. B01d 53/14, 47/00
U.S. Cl. 55—84                                    11 Claims

ABSTRACT OF THE DISCLOSURE

The separation of vaporous aldehydes from offgas formed in the oxo process by scrubbing with solvents wherein high boiling point oxonation products (i.e. products of the oxo reaction) and/or high boiling point hydrogenated oxonation products are used as the solvent. The resultant solutions containing aldehydes are processed together with the bulk of the oxonation products. Alcohols which are suitable for the production of plasticizers may be prepared from the aldehydes obtained.

---

This invention relates to an improved process for the separation of aldehydes from offgas formed in the oxo process by scrubbing with a solvent. The aldehydes have hitherto been recovered from the offgas from the oxo reaction by scrubbing with water. The use of water as scrubbing liquid has the disadvantage that the solvent power of water for the aldehydes in question is relatively low and therefore large amounts of water are required. The use of water has the further disadvantage that owing to the large amounts of water required for the separation, the aldehydes separated cannot be processed together with the bulk of the oxo reaction products because the latter will not mix homogeneously with the aqueous solution of aldehydes. Separate processing is very expensive because of the large amounts of water.

It is an object of the invention to provide an improved process for the separation of vaporous aldehydes from oxo reaction offgas in which only small amounts of solvent are required. Another object of the invention is to provide an improved process in which it is possible to scrub out more than 90% of the vaporous aldehydes from the oxo reaction offgas at atmospheric pressure with relatively small amounts of solvent. A further object of the invention is to provide an improved process in which the solution containing aldehyde obtained is worked up together with the bulk of the aldehyde produced in the oxo reaction.

In accordance with this invention these and other objects and advantages are achieved in an improved process for separating vaporous aldehydes having three to five carbon atoms from oxo reaction offgas by bringing it into contact with a solvent, in which the improvement consists in using as the solvent a high boiling point oxonation product and/or a high boiling point hydrogenated oxonation product.

We have found that vaporous aldehydes can be advantageously separated by scrubbing with solvents from oxo reaction offgas by using as the solvent a high boiling point oxonation product or a high boiling point hydrogenated oxonation product.

The new process has the advantage that smaller amounts of solvent can be used. Moreover it is possible, even at atmospheric pressure, to scrub out more than 90% of the vaporous aldehydes with relatively small amounts of solvent. Another advantage is that the solution containing aldehydes can be processed together with the bulk of the aldehydes obtained in the oxo reaction.

The aldehydes to be separated preferably have three to five, particularly three or four, carbon atoms. They are prepared according to the oxo process by reaction of appropriate olefins with hydrogen and carbon monoxide in the presence of cobalt carbonyl. Examples of aldehydes suitable for separation by the process according to this invention are propionaldehyde, n-butyraldehyde, isobutyraldehyde and valeraldehyde. n-Butyraldehyde and isobutyraldehyde are of particular technical importance as aldehydes to be separated.

The offgas formed in the oxo reaction consists essentially of carbon monoxide and hydrogen together with small amounts of saturated and unsaturated hydrocarbons having two to four carbon atoms and small amounts of inert gases, such as nitrogen. Offgas also includes any gas obtained by aftertreatment of the oxo reaction mixture with air, hydrogen or other gases which may be carried out subsequently. The aldehyde content of the offgas is dependent on the composition of the oxonation product and on the temperature and pressure at which flashing is carried out. Offgas obtained by flashing the oxonation product to atmospheric pressure may contain up to about 800 g. of aldehydes per cubic meter (STP) in the vapor phase. Offgas obtained by partial flashing for example to 5 to 10 atmospheres gauge, usually has an aldehyde content of 20 to 200 g. per cubic meter (STP).

The solvent used is a high-boiling oxonation product and/or a high-boiling hydrogenated oxonation product having a boiling point of advantageously more than 95° C., preferably more than 150° C. Preferred high-boiling oxonation products are obtained for example as distillation residue in the processing of the oxo reaction mixture, whereas the high-boiling hydrogenated oxonation products are obtained as residue from the processing of hydrogenated oxo products. They consist essentially of higher aldehydes, such as are formed by aldol condensation from the lower aldehydes produced, acetals, carboxylic esters and higher alcohols. The main product of the oxo reaction is also suitable provided its boiling point is above 95° C., for example butanol or n-propanol.

In general 0.1 to 2 kilograms, preferably 0.2 to 1 kilogram, of solvent is used per cubic meter of offgas to be scrubbed. The solvent is advantageously at room temperature during the scrubbing, for example at 15° to 25° C. Particularly good results are obtained when the solvent is kept at 5° to 10° C. by cooling. Scrubbing of the offgas is in general carried out at pressures of 0 to 30 atmospheres gauge. The higher the pressure of the gas to be scrubbed, the less the amount of solvent required. It is advantageous to carry out the scrubbing at the pressure at which the offgas is obtained in the various flashing stages in the oxo process.

Conventional industrial equipment for scrubbing gases is used for separating the vaporous aldehydes from the offgas. It is preferred to use bubble tray columns or packed columns through which the gas to be scrubbed is passed for example countercurrently to the solvent.

The solvent containing aldehyde may be processed by itself and the recovered solvent may be reused for the scrubbing process. It is advantageous to process the solvent containing aldehydes together with the bulk of the product obtained in the oxo reaction.

The process according to the invention is carried out for example by metering in the high-boiling solvent into the top of a suitable scrubber and passing the offgas containing aldehyde vapor through the column cocurrently or countercurrently. The solvent containing aldehydes is withdrawn at the bottom of the column. The aldehydes obtained according to the process of the invention are suitable for the production of alcohols from which plasticizers may be obtained by esterification with phthalic acid.

The invention is illustrated by the following examples.

Example 1

110 cubic meters (STP) of ethylene and 280 cubic meters (STP) of a gas mixture consisting of equal parts by volume of carbon monoxide and hydrogen are reacted in a high-pressure vessel provided with cooling means in the presence of 9 liters of aqueous cobalt acetate solution which contains 20 g. of cobalt per liter at 180° C. and 250 atmospheres gauge in liquid phase. 340 liters of oxonation products is obtained which, after it has left the high pressure vessel, is cooled to 30° to 40° C. and separated in a separator under a pressure of 250 atmospheres gauge from unreacted gases. 40 cubic meters (STP) of unreacted gas is recovered. The gas withdrawn is practically free from aldehydes. The oxonation products are flashed to 5 atmospheres gauge in another separator, 10 cubic meters (STP) of a gas consisting mainly of carbon monoxide and hydrogen being obtained which contains 104 g. of vaporous propionaldehyde per cubic meter (STP). This gas is introduced into the bottom of a 20-tray scrubber having a diameter of 30 cm., while there is introduced into the top of the column, by means of a pump, an hourly amount of 6 liters of a distillation residue obtained in processing the oxonation products obtained which consists essentially of 47% of n-propanol, 17% of p-propionaldehyde, and 26% of higher boiling condensation products of propionaldehyde and which still contains 3.5% of monomeric propionaldehyde. 91.5% of the propionaldehyde contained in the gas introduced is scrubbed out. The scrubbing liquid which is withdrawn from the bottom of the column and which contains 18% by weight of propionaldehyde is combined with the bulk of the oxo product and processed together with it.

If water is used instead of distillation residue as the solvent for scrubbing out vaporous propionaldehyde contained in the expanded gas, 23 liters of water per hour is required to achieve the same scrubbing effect. The scrubbing liquid obtained in the bottom of the column contains only 4% by weight of propionaldehyde.

Example 2

The 10 cubic meters (STP) per hour of offgas obtained according to Example 1 in the expansion of the oxonation products to 5 atmospheres gauge is further expanded, after leaving the separator, to a slight residual pressure of about 0.2 atmosphere gauge and then combined with another hourly amount of offgas of 1.2 cubic meters (STP) which is obtained in a third separator by complete flashing of the oxo product and which contains 490 g. of propionaldehyde per cubic meter (STP). The combined gas amounting to 11.2 cubic meters (STP) and having a propionaldehyde content of 142 g. per cubic meter (STP) is introduced at slightly superatmospheric pressure, i.e. at about 0.2 atmosphere gauge, into the bottom of the scrubbing column described in Example 1, while at the top 12 liters of a residue obtained in the hydrogenation of the oxo product, which consists of 70% of n-propanol and 30% of higher boiling point condensation products of propionaldehyde, as for example methylpentanol, is metered in 90% of the propionaldehyde contained in the gas mixture is absorbed by the solvent. The scrubbing liquid withdrawn from the bottom of the column contains 11.5% of propionaldehyde. It is processed after having been combined with the bulk of the oxo product.

If water is used instead of oxo product residue as the solvent, only 43% of the propionaldehyde contained in the gas mixture can be scrubbed out with the same amount of liquid, i.e. 12 liters per hour. The amount of propionaldehyde scrubbed out rises to 70% with 45 liters of water per hour. To achieve 90% scrubbing, more than 150 liters per hour of water is required.

Example 3

20 cubic meters (STP) per hour of offgas containing 240 g. of n-butyraldehyde and isobutyraldehyde per cubic meter (STP) and obtained by flashing a propyleneoxonation product is introduced into the bottom of the 20-tray column described in Example 1 at a pressure of 0.5 atmosphere gauge. 20 liters per hour of residue boiling above 200° C. obtained in processing the resultant oxo products is metered in at the top of the column. 95% of the n-butyraldehyde and isobutyraldehyde contained in the offgas is taken up by the solvent. The scrubbing liquid drawn off at the bottom of the column contains 21% by weight of butyraldehyde.

If water be used as solvent instead of the oxo product residue, only 18% of the butyraldehyde contained in the offgas can be scrubbed out with the same amount of liquid (20 liters per hour). 90% scrubbing practically cannot be achieved with water as solvent under the conditions used.

We claim:

1. An improved process for separating vaporous aldehydes having three to five carbon atoms from offgas formed in the oxo process and containing up to 800 g. of the said aldehydes per cubic meter, which process comprises:

bringing the offgas into contact with a solvent for said aldehydes which is at least one member selected from the group consisting of an oxonation and a hydrogenated oxonation product having a boiling point above 95° C., the amount of said solvent used being 0.1 to 2.0 kg. per cubic meter of offgas to be scrubbed.

2. A process as claimed in claim 1 wherein the offgas contains aldehydes having three to four carbon atoms.

3. A process as claimed in claim 1 wherein the offgas contains butyraldehydes.

4. A process as claimed in claim 1 wherein the offgas contains 20 to 200 g. of aldehydes per cubic meter.

5. A process as claimed in claim 1 wherein the solvent used is an oxonation product and/or hydrogenated oxonation product boiling at above 150° C.

6. A process as claimed in claim 1 wherein the solvent used in a distillation residue obtained in processing the oxonation and/or hydrogenated oxonation product.

7. A process as claimed in claim 1 wherein 0.2 to 1.0 kg. of solvent is used per cubic meter of offgas to be scrubbed.

8. A process as claimed in claim 1 carried out at a temperature of 15° to 25° C.

9. A process as claimed in claim 1 carried out at a temperature of 5° to 10° C.

10. A proces a claimed in claim 1 wherein the offgas is brought into contact with the solvent at a pressure of 0 to 30 atmospheres gauge.

11. A process as claimed in claim 1 wherein the solution containing aldehydes is processed together with the bulk of the oxonation products.

References Cited

UNITED STATES PATENTS 2,841,618    7/1958    Aldridge et al. _____ 260—604

FOREIGN PATENTS 1,032,135    6/1966    Great Britain.

REUBEN FRIEDMAN, Primary Examiner
CHARLES N. HART, Assistant Examiner

U.S. Cl. X.R.

260—604

UNITED STATES PATENT OFFICE
CERTIFICATE OF CORRECTION

Patent No. 3,455,091                      July 15, 1969

Horst Kerber et al.

It is certified that error appears in the above identified patent and that said Letters Patent are hereby corrected as shown below:

In the heading to the printed specification, line 4, "Horst Herber" should read -- Horst Kerber --. Column 4, line 54, "proces a" should read -- process as --.

Signed and sealed this 5th day of May 1970.

(SEAL)
Attest:

Edward M. Fletcher, Jr.            WILLIAM E. SCHUYLER, JR.
Attesting Officer                   Commissioner of Patents